United States Patent [19]

Crossno et al.

[11] Patent Number: 4,962,463

[45] Date of Patent: Oct. 9, 1990

[54] VIDEO IMAGING DEVICE WITH IMAGE ALTERING CONTROLS AND RELATED METHOD

[75] Inventors: Patricia J. Crossno; Gary H. Mendelsohn; William F. Hedberg, all of Albuquerque, N. Mex.

[73] Assignee: Digital Equipment Corporation, Maynard, Mass.

[21] Appl. No.: 214,221

[22] Filed: Jul. 1, 1988

[51] Int. Cl.$^5$ .............................................. G09G 1/06
[52] U.S. Cl. ................................... 364/518; 340/721; 364/521
[58] Field of Search ................ 364/518, 521; 340/721, 340/724, 731, 747; 382/41–47

[56] References Cited

U.S. PATENT DOCUMENTS 4,663,619  5/1987  Staggs et al. ........................ 340/747
4,665,555  5/1987  Alker et al. ...................... 340/747 X Primary Examiner—Gary V. Harkcom
Assistant Examiner—H. R. Herndon
Attorney, Agent, or Firm—Finnegan, Henderson, Farabow, Garrett and Dunner

[57] ABSTRACT

A video imaging device coupled to a host computer by a communication line over which control data is transmitted, to one or more sources of video information, and to a monitor by a video line over which video signals based upon the video information and control data are transmitted, includes a converting unit for converting the video information into the video signals for transmittal to the monitor. A receiver receives the control data transmitted over the communication line. The control data includes condition data and associated instruction data with at least some of the instruction data being adapted to alter at least some of the condition data upon execution of the associated instruction data. Stored condition data may be selected in response to user generated event data and display of the video signals on the monitor is manipulated by execution of the instruction data associated with the selected condition data.

6 Claims, 6 Drawing Sheets

VIDEO IMAGING DEVICE WITH IMAGE ALTERING CONTROLS AND RELATED METHOD

BACKGROUND OF THE INVENTION

I. Field of the Invention

The invention relates generally to a method and related video imaging device coupled to a host computer for communicating video signals to a monitor from a source of video information in response to control data received from the host computer, and specifically to a method and related video imaging device that enables a resultant image on the monitor to be selectively altered with minimal intervention by the host computer.

II. Background Information

In previously known systems, a host computer is coupled by a communication line to a video imaging device. Video information received at the video imaging device from either the host computer or from a local video source is converted at the video imaging device to video signals that are delivered to a monitor for visual display of a corresponding image. In such systems, in order for a user to alter the image displayed on the monitor, the user must initiate events (i.e., push a button, move a pointer) that are received by the video imaging device as user generated event data which is then passed to the host computer over the communication line for subsequent processing. In these cases, instruction data, which is defined as a result achieved from processing the user generated event data by the host computer, is returned to the video imaging device over the communication line. Such video imaging devices alter the resultant display of the image on the monitor in response to the instruction data received from the host computer. The instruction data of such devices is, therefore, entirely defined and controlled by the host computer.

These prior art systems are unacceptable due to the slow speeds of the communication line between the video imaging device and the host computer, thus preventing real-time image alteration in response to the user generated events. For example, if the position of an image on a monitor were to track the movement of a mouse connected to the video imaging device, the instruction data to display the image at the new mouse coordinates will increasingly lag behind the current mouse location as more and more new coordinates are input by the user and sent to the host computer for processing.

In order to avoid the requirement for user generated event data to be communicated between the video imaging device and the host computer, other known systems hardcode desired instruction data into firmware of the video imaging device. Hardcoding the specific instruction data into the firmware of the video imaging device provides the desired response time. Hardcoding is disadvantageous, however, in that it results in the instruction data being totally inflexible. Changing the instruction data requires that firmware memories in the video imaging device storing the instruction data be accessed and physically revised or replaced in order for new instruction data to be executed in response to particular user generated events.

SUMMARY OF THE INVENTION

In accordance with the purpose of the invention as embodied and broadly described herein, there is provided a video imaging device which is adapted to be coupled to (i) a host computer by a communication line over which control data is transmitted, (ii) a source of video information and to (iii) a monitor by a video line over which video signals based upon that video information and control data are transmitted from the video imaging device to the monitor, with that video imaging device comprising: a mechanism for converting the video information into video signals for transmitting to the monitor over the video line; a mechanism for receiving control data transmitted over the communication line, the control data including condition data and associated instruction data with at least some of the instruction data being adapted to alter at least some of the condition data upon execution of that instruction data; a mechanism for storing the received control data; a mechanism for receiving user generated event data for selection of the stored control data; a mechanism for selecting certain of the stored condition data in response to the event data; a mechanism for manipulating display of the video signals by execution of the instruction data associated with the selected certain condition data; and a mechanism for altering the stored condition data by execution of at least some of the instruction data.

Preferably, the video image device of the present invention further includes a mechanism for converting the event data into at least one event data block and a mechanism for transforming the stored control data into a plurality of condition data blocks and associated instruction data blocks; and preferably the mechanism for storing includes a mechanism for storing the condition data blocks and the instruction data blocks and the mechanism for selecting comprises a mechanism for comparing the event data block and the plurality of condition data blocks to select zero or more condition data blocks in response to the comparison.

Still further, the mechanism for receiving the control data preferably comprises an asynchronous buffer and the mechanism for receiving the user event data also comprises an asynchronous buffer. It is also preferable that the mechanism for manipulating comprises a mechanism for executing the instruction data blocks associated with the selected condition data blocks.

The subject invention further comprises methods relating to the foregoing apparatus.

The accompanying drawings, which are incorporated in and constitute a part of the specification, illustrate one embodiment of the invention and, together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings.

Figure 1:
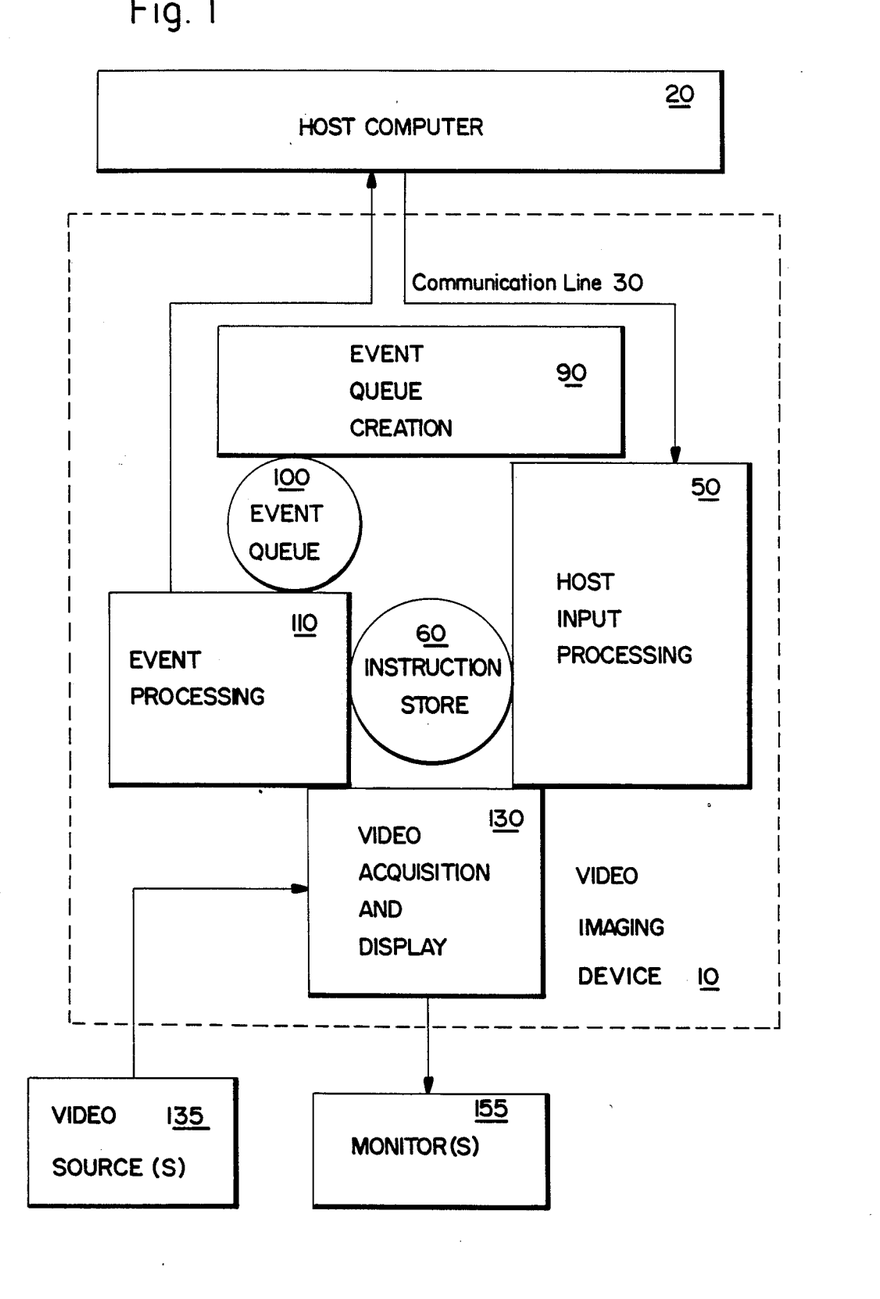
FIG. 1 is a block diagram of the major components of a video imaging device incorporating the teachings of the present invention.

FIG. 1 is a block diagram of a video imaging system in accordance with an embodiment of the present invention, which includes a video imaging device 10, one or more video sources 135, one or more monitors 155, and a host computer 20. Video imaging device 10 comprises host input processing unit 50, event queue creation unit 90, event processing unit 110, and video acquisition and display unit 130. Hose input processing unit 50 includes instruction store 60, and event queue creation unit 90 includes event queue 100. Video imaging device 10 is coupled to host computer 20 by communication line 30 over which ANSI terminal data, control data, event data, and video information in the form of pixel data are transmitted. Host input processing unit 50 transforms control data into condition data from host computer 20 blocks, called paradigm element blocks (PEBs), and their associated instruction data blocks, called primitive action blocks (PABs). The PEBs are preferably configured into one PEB list and the PABs are preferably configured into a plurality of PAB lists which each correspond to one PEB in the PEB list. Each PEB is identified by a group identifier and an element identifier. The PEBs and PABs are stored in an instruction store 60 for later scanning by event processing unit 110.

An event queue 100 stores event data blocks, called event blocks (EVBs), created by event queue creation unit 90 prior to processing by event processing unit 110. One or more video sources 135 provide video information which is passed to video acquisition and display unit 130 for storage, manipulation, and display on one or more monitors 155.

Figure 2:
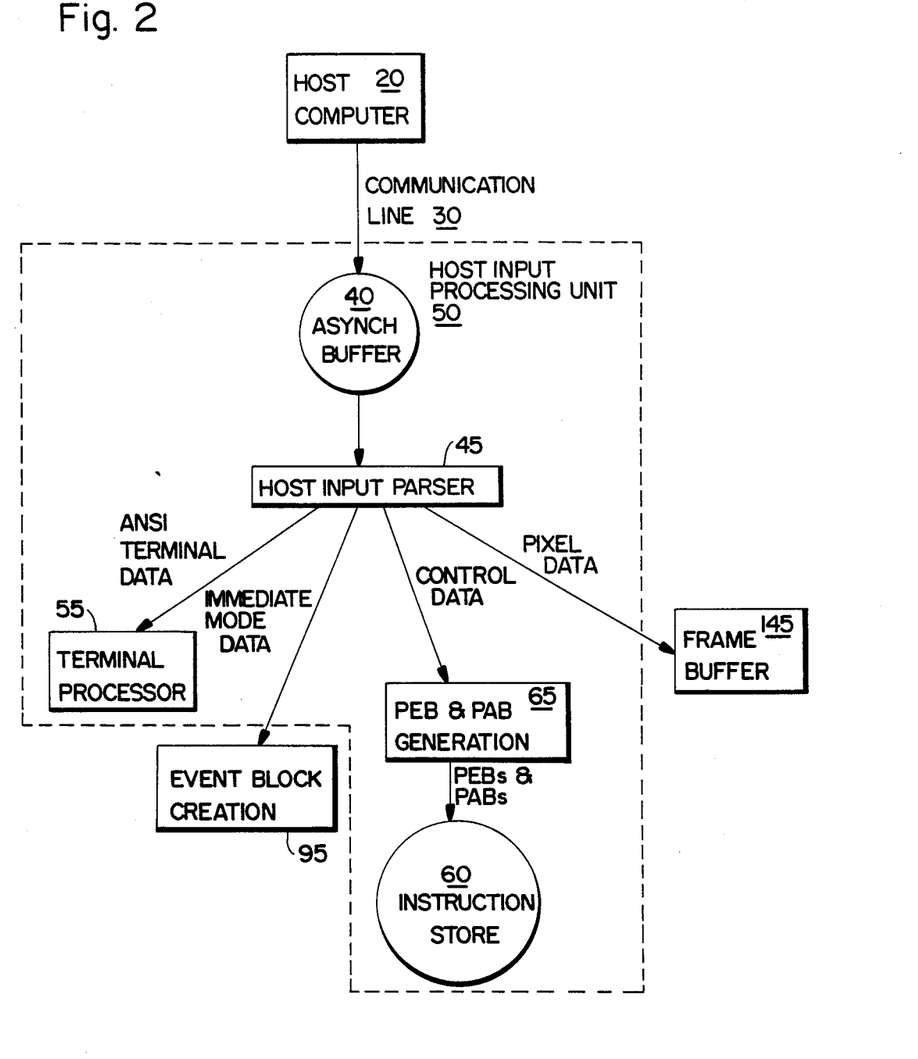
FIG. 2 is a block diagram detailing the internal components of host input processing unit 50 and its interactions with other units and data structures shown in FIG. 1.

FIG. 2 is a block diagram of host input processing unit 50, which preferably comprises asynchronous buffer 40, host input parser 45, terminal processor 55, PEB and PAB generation unit 65, and instruction store 60. An asynchronous buffer, such as buffer 40, is defined as a buffer that is filled at speeds and intervals that are independent of those used to empty it. Preferably, asynchronous buffer 40 uses a software implemented circular or ring buffer. Data coming over communication line 30 is placed in asynchronous buffer 40 to await processing. When asynchronous buffer 40 becomes non-empty, host input parser 45 is activated and removes data from the buffer in the order in which it was received. Host input parser 45 continues to process data from asynchronous buffer 40 until the buffer is empty. When more data is received into asynchronous buffer 40, host input parser 45 is reactivated. Host input parser 45 routes ANSI terminal data to terminal processor 55, event data to event block creation unit 95 (described below in connection with FIG. 3), control data to PEB and PAB generation unit 65, and pixel data to frame buffer 145 (described below in connection with FIG. 5). PEB and PAB generation unit 65 translates control data into PEBs and associated PABs, which are then stored in instruction store 60.

Figure 3:
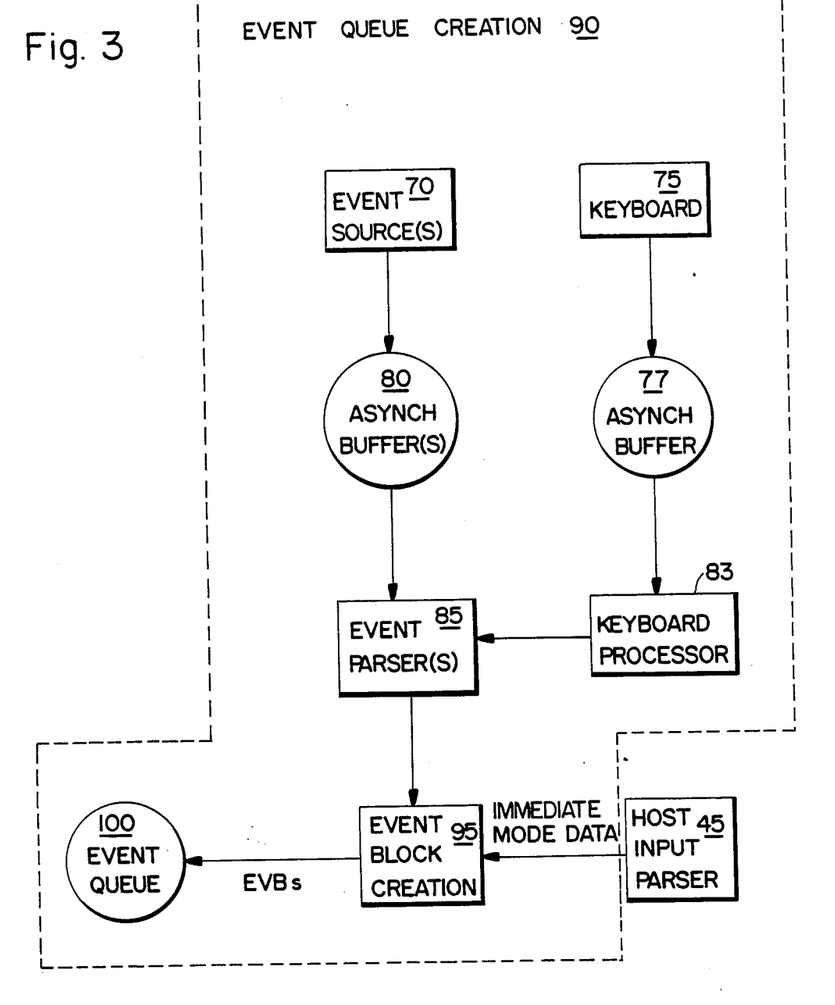
FIG. 3 is a block diagram detailing the internal components of event queue creation unit 90 and its interactions with other units and data structures shown in FIG. 1.

FIG. 3 is a block diagram of event queue creation unit 90, which comprises keyboard 75, asynchronous keyboard buffer 77, keyboard processor 83, event source(s) 70, asynchronous buffer(s) 80, event parser(s) 85, event block creation unit 95, and event queue 100. Keyboard 75 generates data that is stored in asynchronous keyboard buffer 77 until it can be parsed and processed by keyboard processor 83. User generated event data is captured by one or more event sources 70. Two examples of event sources are a mouse and a clock. Each event source 70 fills an associated asynchronous buffer 80 that is then emptied by an associated event parser 85. One or more event parsers 85 transmit valid event data to event block creation unit 95 which creates EVBs and stores them in event queue 100 to await processing, activating event processor 105 (see FIG. 4) if event queue 100 has become non-empty.

Host input parser 45 of FIG. 2 may transmit immediate mode event data from host computer 20 to event block creation unit 95. Immediate mode event data permits host computer 20 to initiate immediate instruction processing that is not event activated, that is, does not require the comparison and correlation between an EVB and a PEB to execute PABs associated with that PEB. Immediate mode event data can be used to replay earlier sessions that have been captured and stored on host computer 20, or can be used to circumvent local control of video imaging device 10 and place control back in host computer 20, as is done on some conventional systems.

An immediate mode EVB is created by event block creation unit 95 in response to the immediate mode event data generated by host input parser 45. Event block creation unit 95 also generates an immediate mode PEB linked to a single PAB when immediate mode event data is received. This single PAB initiates the immediate instruction processing initiated by host computer 20.

Figure 4:
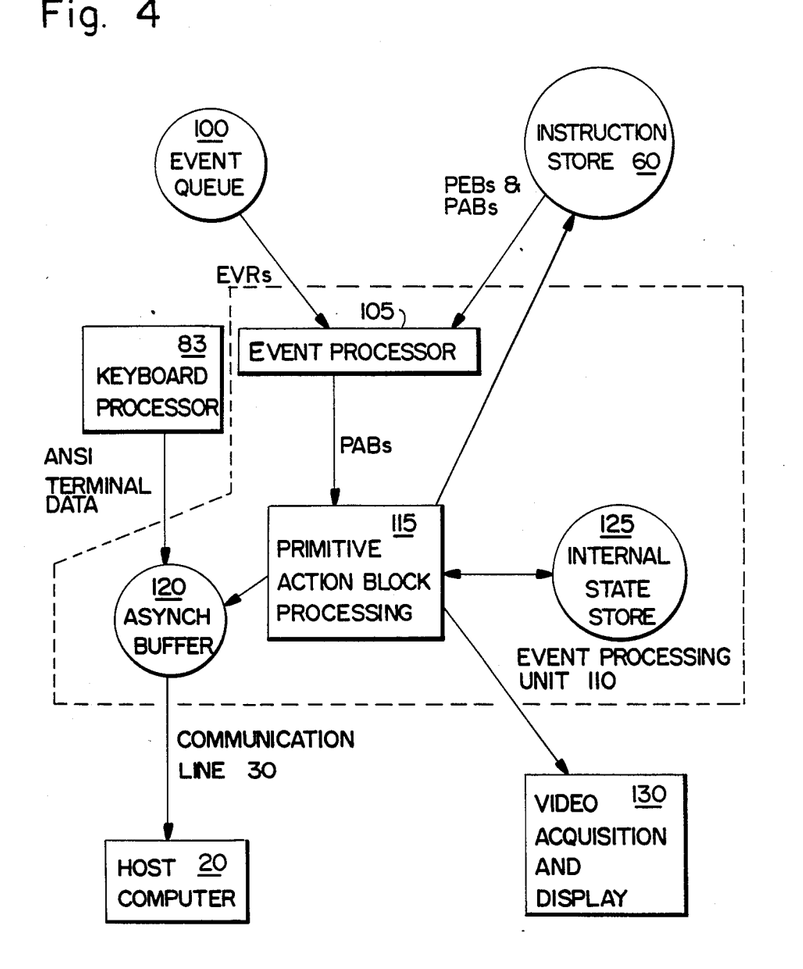
FIG. 4 is a block diagram detailing the internal components of event processing unit 110 and its interactions with other units and data structures shown in FIG. 1.

FIG. 4 is a block diagram of event processing unit 110, which comprises event processor 105, primitive action block processing unit 115, internal state store 125, and asynchronous buffer 120. Event processor 105 is activated when event queue 100 becomes non-empty. Event processor 105 removes EVBs from event queue 100 and scans the PEBs in instruction store 60, seeking a correlation between an EVB and a PEB. The PEBs are scanned in the order they were sent from host computer 20. If a correlation is found between an EVB and a PEB, the PABs associated with that PEB are transmitted to primitive action block processing unit 115 where they are executed. Certain PABs modify the contents of instruction store 60 by deleting PEBs, replacing PEBs, changing PEB field information, or activating and deactivating PEBs. Other PABs cause primitive action block processing unit 115 to load event data, internal state information, pixel data, or text strings into asynchronous buffer 120 to be sent to host computer 20 over communication line 30. Keyboard processor 83 places ANSI terminal data into asynchronous buffer 120 to be passed to host computer 20. Primitive action block processing unit 115 reads internal state information from and writes such information to internal state store 125.

Figure 5:
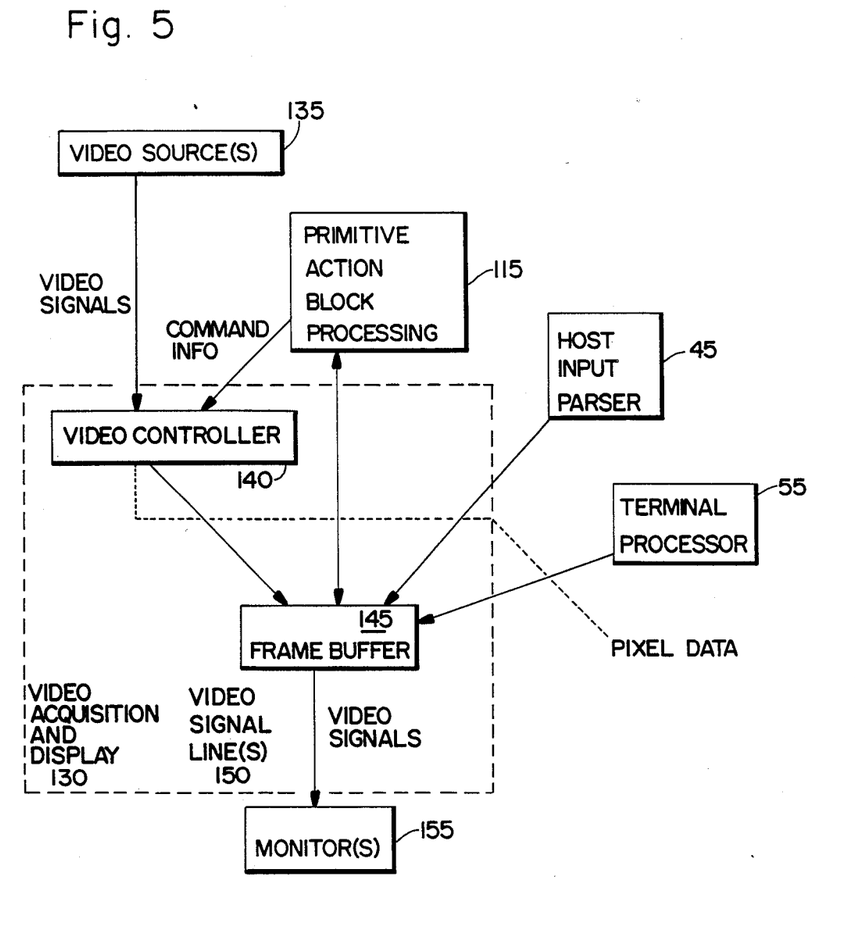
FIG. 5 is a block diagram detailing the internal components of video acquisition and display unit 130 and its interactions with other units and data structures shown in FIG. 1.

FIG. 5 is a block diagram of video acquisition and display unit 130, which comprises video controller 140, frame buffer 145, and one or more video signal lines 150. Video acquisition and display unit 130 is coupled to one or more video sources 135, and to one or more monitors 155. Video acquisition and display unit 130 operates to convert video information received by video imaging device 10 into video signals for transmittal to monitor(s) 155 over video signal line(s) 150. Video information may be in the form of digital or analog video signals. Primitive action block processing unit 115 passes command information to video controller 140.

Video information may be received either from video source(s) 135 or from host computer 20. When not received in pixel data form, video controller 140 converts the received video information into pixel data that is then stored in frame buffer 145. Primitive action block processing unit 115 reads pixel data from frame buffer 45, and then modifies and writes that pixel data back into frame buffer 145. Host input parser 45 writes video information in the form of pixel data passed from host computer 20 into frame buffer 145. Terminal processor 55 writes pixel representations of text and graphics data into frame buffer 145. Frame buffer 145 combines the pixel data from the aforementioned sources and converts the resulting image into video signals that are transmitted over one or more video signal lines 150 for display on one or more monitors 155.

The contents of the EVBs depend upon the nature of event source(s) 70. If, for example, the event sources are a pointing device and a clock, the EVBs may contain fields for the state of the pointing device buttons, the change in the pointing device's x position, the change in the pointing device's y position, and the time. Each EVB also includes an event type field which is given its own code and this code is stored in an EVB along with the event data which generated the EVB. In the case of pointing device buttons, a bit within the event type field is preferably assigned to each of the buttons. As a button is pressed, the corresponding bit in the event type field is set; as the button is released, the bit is cleared. Two EVBs are thus created, one for the press of the button and one for the release of the button. A field containing the states of the other pointing device buttons is also necessary to facilitate multiple button commands.

Each PEB defines the conditions under which local action is taken by video imaging device 10. These conditions all relate to the occurrence of an event. The PEB includes the event type field of interest, state fields that must correlate with the state of video imaging device 10 represented by state data stored in internal state store 125, and a flag indicating whether the PEB is currently active or inactive. Each PEB also contains one or more identification fields that allow PEBs to be referenced for modification or replacement individually or in groups. Identification fields facilitate operations such as switching between active and inactive states in the PEB, altering the associated list of PABs, or deleting or replacing PEBs altogether. Finally, each PEB contains a pointer to an associated list of PABs.

When an immediate mode EVB is created by event block creation unit 95, no correlation between the immediate mode EVB and a PEB is performed. Instead, the immediate mode EVB and its associated immediate mode PEB are assumed to correlate. Immediate mode PEBs are loaded into instruction store 60 by host input parser 45 via PEB and PAB generation unit 65. The associated immediate mode PAB is executed and event processor 105 gets the next EVB from event queue 100 for processing. Otherwise, event processor 105 attempts to correlate the current EVB with one or more of the PEBs stored in instruction store 60. If a correlated PEB is currently active and the event codes in the EVB and the PEB match, the state fields are compared with the state data stored in internal state store 125. If these also match, then the EVB and PEB are deemed to correlate and the associated PAB list is executed by primitive action block processing unit 115. After PAB processing, event processor 105 continues to try to match the EVB against further PEBs until all PEBs have been checked or PEB checking is explicitly terminated by a break instruction PAB.

The break instruction is an important primitive action which halts the scanning and correlation of PEBs by event processor 105 when it is not appropriate to perform additional actions. Break instruction PABs are predominently employed in a PAB list which contains a resume instruction to switch the state of a second PEB further down in the PEB list from inactive to active. When the second PEB contains the same event code as the current PEB and execution of the PAB list associated with the second PEB is not desired in conjunction with the current event, a break instruction PAB located at the end of the PAB list associated with the first PEB is necessary. An example of a situation such as this, where the desired operation would be impossible to implement without the use of a break instruction PAB, is presented in the description of FIG. 6 below.

A PAB is a data block that describes an action to be performed. Each PAB contains a field that either points to the next PAB in the list or indicates that it is the last in the list of PABs. Each PAB further contains a pointer to a specific set of instructions, known as primitive actions, that may be either resident in video imaging device 10 or loaded by host computer 20. Each PAB also contains the number and locations of the data used for input and output of the primitive actions. This data may be specific, literal values stored in the PAB itself, or data in internal state store 125 such as: current pointing device position, video acquisition regions, image cropping regions of interest, origin and destination regions of interest, and menu regions. These regions are either explicitly initialized by host computer 20, or they are dynamically defined and redefined by primitive action execution. This permits, for example, an image acquired from a local video source to be repeatedly operated upon without continually re-specifying its size and location within the frame buffer (even after the size and location are modified by one or more of the operations).

All of the various internal activities of video imaging device 10 are logically synchronized with each other and with the various external input and output operations to prevent the corruption or loss of data and to preserve event and data order. There are several methods of performing synchronization. One method ascertains which operations need to be performed by polling status information. The most important operation is then selected and processed immediately. Another method is a single level interrupt system. When an interrupt occurs, the operation associated with that interrupt is compared with the current activity. If the operation associated with the interrupt is of equal or lesser importance to the operation being performed, the interrupt is assigned a priority and is queued to be processed later. Another method involves a multilevel, priority-ordered, preemptive interrupt system that directly ensures that the currently highest priority operation is processed. Another possibility is to use multiple independent processors, running in parallel, that only pause briefly when more than one processor accesses a hardware-synchronized, shared-data resource such as an asynchronous buffer or event queue.

On power up, video imaging device 10 preferably operates as a terminal. Keyboard characters are transmitted to host computer 20, echoed back and displayed on monitor(s) 155. Host characters are interpreted and also displayed on monitor(s) 155. PEBs and PABs are loaded into instruction store 60 by running an application program on host computer 20 which transmits condition and instruction data to video imaging device 10. The application program is preferably user or event accessible so that the PEBs and PABs loaded into device 10 can be readily altered, instead of requiring a change in terminal hardwiring as is necessary in some of the prior art.

A PEB's position in the PEB list created by host computer 20 is based on the definition sequence from host computer 20; order is not related to the PEB group or element identifiers. Because the PEB list is scanned sequentially, frequently used operations are preferably loaded first to avoid unnecessary and time-consuming comparisons. Loading from host computer 20 can be initiated through video imaging device 10 operating as a terminal, or from another device connected to host computer 20. Incremental PEB definition to decrease initialization time is also an option. Later applications clear PEBs and PABs from instruction store 60 by sending immediate mode event data combined with a global undefine instruction.

Figure 6:
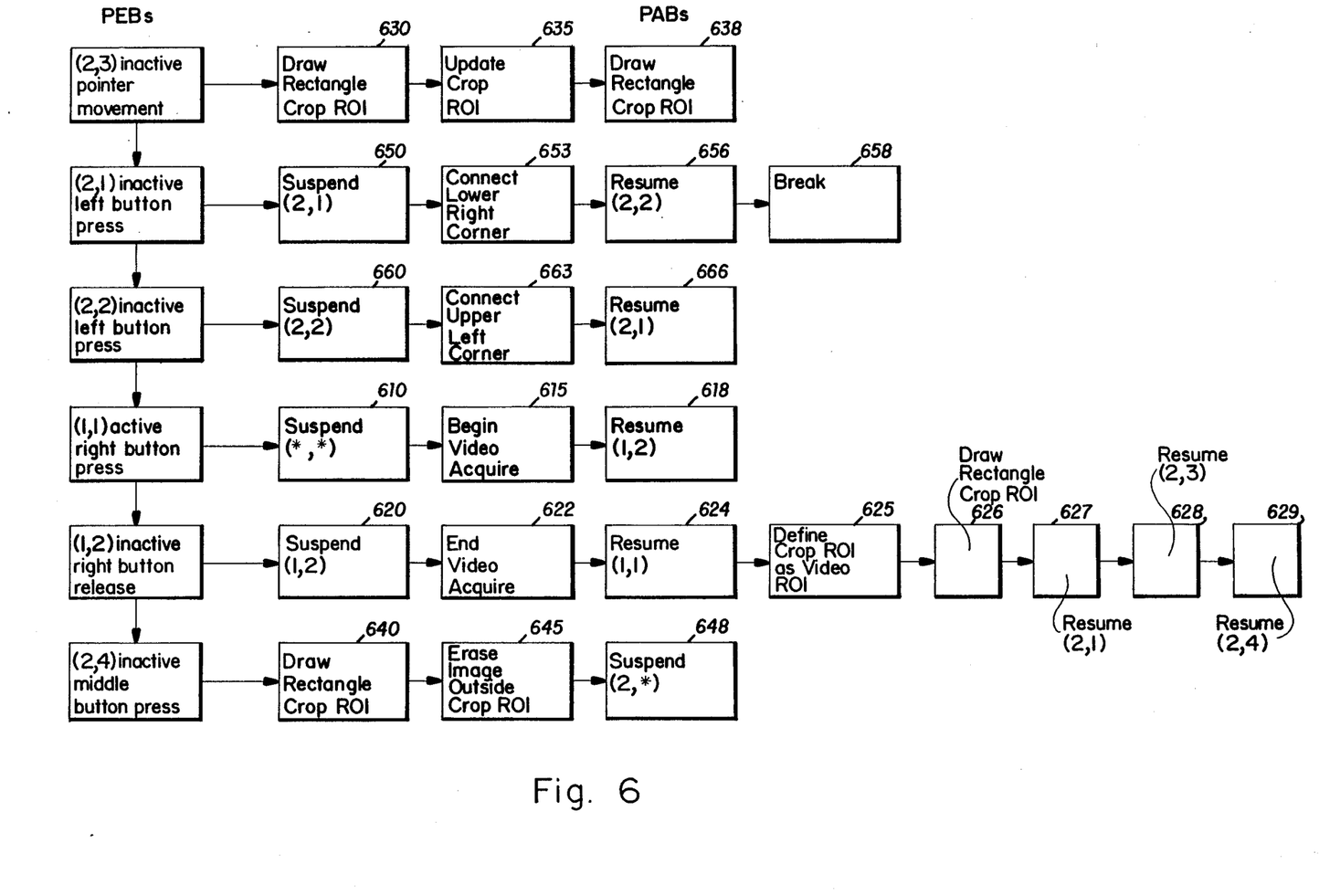
FIG. 6 illustrates a specific example of condition data blocks and associated instruction data blocks in a sample application.

FIG. 6 illustrates a sample application to acquire and crop an image from a local video source. "Crop" is defined as an operation where a subset of an image is selected, and then all of the image except the subset is erased. In this example, the pointing device has three buttons. A right button press begins video acquisition; a right button release stops video acquisition on the current frame. The acquired image is highlighted on monitor 155 (see FIG. 1) by a rectangular outline to define the currently selected image subset for the crop operation. Initially, this subset is the entire image. At the beginning, the upper left corner of the rectangle moves in conjunction with movement of the pointing device. Left-right pointer movement correspondingly moves the left side of the rectangle; up-down pointer movement moves the top of the rectangle. The left button operates as a toggle to switch the pointer connection between the upper left and the lower right corners of the rectangle. Pressing the left button once and pointer movement controls the right and bottom sides of the rectangle. Pressing the left button again and the pointer connection returns to the initial configuration. The middle button terminates the operation. The rectangle is erased, the image outside of the rectangle is erased, and only the right button remains active so that the operation may be repeated.

FIG. 6 demonstrates the use of PEB group and element identifiers, regions of interest (ROIs) including a crop ROI defining an area of the image to be cropped and a video ROI defining an area on monitor(s) 155 on which a video image is to be displayed, and the suspend, resume, and break instructions. Other instructions, such as deleting or replacing PEBs and/or PABs, may also be associated with a PAB. Each PEB contains an identifier, such as (2,1), where 2 is the group and 1 is the element within the group. An event code and startup state of each PEB is also given. Initially, only PEB (1,1) is active.

Until the right button is pressed, video imaging device 10 only functions as a terminal. When the right button pressed, an EVB corresponding to the pressing of that button is generated by event queue creation unit 90. Event processor 105 correlates that EVB with PEB (1,1), and the list of PABs associated with PEB (1,1) is passed to primitive action block processing unit 115.

The first PAB 610 suspends every PEB in the PEB list, resetting all the state flags to inactive. In the example given, the only PEB affected is PEB (1,1) since all the other PEBs are inactive. The next PAB 615 sends control data to video controller 140 to start converting video information from one of the video sources 135 into pixel data and to place the resulting image in frame buffer 145. Frame buffer 145 converts the image combined with any characters or graphics back into video signals to be displayed on monitor(s) 155. The video ROI defaults to the frame buffer location and size of the newly acquired video image. The last PAB 618 in the PAB list sets PEB (1,2) to active. When PAB processing is complete, event processor 105 resumes checking the EVB against the remainder of the PEB list. No further correlations are made since the only active PEB (1,2) has an event code of a right button release, which is not a match. However, more than one PEB may correlate with any given EVB. Until the user releases the right button, any other EVBs, such as pointer movements, will be compared against the PEBs in the PEB list.

When the user releases the right button, a corresponding EVB is generated that correlates with PEB (1,2). The associated list of PABs is executed. The first PAB 620 resets the state flag to inactive in PEB (1,2). The second PAB 622 instructs video controller 140 to stop acquiring and converting video signals. The third PAB 624 reactivates PEB (1,1) so the user can acquire another image if the current image in frame buffer 145 is unsatisfactory. The fourth PAB 625 initializes the crop ROI based on the contents of the video ROI. Both ROIs are kept in internal state store 125. The next PAB 626 highlights the crop ROI by performing an "exclusive-or" (XORing) function on a rectangular outline of the crop ROI with the acquired image. The last three PABs, PAB 627, PAB 628, and PAB 629 in the PAB list activate PEBs (2,1), (2,3) and (2,4), respectively. Event processor 105 is unable to find any further correlations in the PEB list because none of the PEBs in group 2 have right button event codes.

Depending on the next event generated, several things can happen. If the user presses the right button again, the sequence described above will be repeated. The only difference is that the first PAB additionally suspends PEBs (2,1), (2,3), and (2,4), now in the active state. If the user moves the pointing device, the corresponding EVB correlates with PEB (2,3) and the three PABs associated with PEB (2,3) are executed. The first PAB 630 redraws the XOR rectangle around the crop ROI to erase it. The next PAB 635 updates the upper left corner of the crop ROI to reflect the new coordinates of the pointing device. The last PAB 638 draws a new XOR rectangle around the updated crop ROI.

If the user presses the middle button, PEB (2,4) correlates with the resultant EVB and three primitive actions are executed. The first PAB 640 erases the XOR rectangle from around the crop ROI, the second PAB 645 erases the image regions outside of the crop ROI, and the last PAB 648 suspends all the PEBs in group 2.

If the user presses the left button, the corresponding EVB correlates with PEB (2,1) and the associated list of PABs is executed. The initial PAB 650 deactivates PEB (2,1), the second PAB 653 connects the pointing device movements to the lower right corner of the crop ROI, the third PAB 656 activates PEB (2,2), and the last PAB 658 is a break instruction PAB.

Now the break instruction PAB can be appreciated without the break instruction PAB, event processor 105 would correlate the current EVB with PEB (2,2) since they both have a left button press event code and PEB (2,2) is now active. Executing the PABs 660, 663 and 666 linked to PEB (2,2) would immediately reset the pointer to the upper left corner with a net result of no change. Reversing the order of PEB (2,1) and (2,2) in the PEB list would not solve the problem; the first press of the left button would switch the corners, but the second press would appear not to work at all. The break instruction PAB is therefore required to provide a switching mechanism between two or more PEBs that correlate with the same EVB. The break instruction PAB can also be used to terminate scanning of the PEB list for efficiency reasons when it is known that none of the remaining active PEBs correlate with the current EVB.

Thus, through the present apparatus and method, the user is afforded the flexibility to execute an almost limitless number of desired instruction data in response to user generated events without requiring all user generated events to be passed to the host computer over the communication line for subsequent processing, as required by host computer centered systems. Furthermore, the user is not limited to executing instruction data that is hardcoded into the firmware of the video imaging device in response to user generated events, but instead may easily request the host computer to alter instruction data.

In summary, video imaging device 10 of FIG. 1 is adapted to be coupled to (i) host computer 20 by a communication line 30 over which control data (in addition to ANSI terminal data, immediate mode event data, and pixel data) is transmitted, (ii) to at least one source of video information (as illustrated in FIG. 1 by video source(s) 135 and/or host computer 20), and to (iii) video signal line(s) (150 FIG. 5) over which video signals based upon that video information and control data are transmitted from video image device 10 to monitor(s) 155. Video imaging device 10 as described above includes video acquisition and display unit 130 which, among other things, operates to convert the video information received either from video source(s) 135 and/or host computer 20 into video signals for transmittal to monitor(s) 155 over video line(s) 150. In addition, video imaging device 10 includes asynchronous buffer 40 which operates to receive control data transmitted from host computer 20 over communication line 30, the control data including condition data and associated instruction data with at least some of the instruction data being adapted to alter at least some of the condition data; instruction store 60 which operates to store the received control data in the form of condition data blocks (PEBs) and instruction data blocks (PABs); and asynchronous buffer(s) 80 which receives user generated event data from event source(s) 70 for selection of the control data stored in instruction store 60.

Event processor 105 of FIG. 4 operates to select certain of the stored control data (specifically certain of the PEBs stored in instruction store 60) in response to event data (EVBs) stored in event queue 100. Primitive action block processing unit 115 (see FIG. 4 and FIG. 5) operates in combination with video controller 140 to manipulate display of video signals transmitted from frame buffer 145 by execution of the PABs associated with the selected PEBs.

Video imaging device 10 permits alteration of the stored PEBs by execution of certain PABs, such as the suspend, resume, and break instruction PABs, thereby establishing a degree of flexibility in the operation of video imaging device 10 beyond that available in prior art hardcoded devices.

It will be apparent to those skilled in the art that various modifications and variations can be made in the apparatus and method of the present invention without departing from the spirit or scope of the invention. Other embodiments of the invention will be apparent to those skilled in the art from consideration of the specification and practice of the invention. It is intended that the specification and examples described herein be considered as exemplary only, with a true scope and spirit of the invention being indicated by the following claims and their equivalents.

What is claimed is:

1. A video imaging device including means for coupling said video imaging device to (i) a host computer by a communication line over which control data is transmitted, (ii) a source of video information, and (iii) a monitor by a video line over which video signals based upon that video information and control data are transmitted from the video imaging device to the monitor, said control data including information for forming condition blocks and corresponding sets of instruction blocks, each of said condition blocks being settable into an active or an inactive state, and each of said instruction blocks containing at least one instruction to be executed by said video imaging device which either manipulates the video signals or sets the state of at least one said condition block, said video imaging device comprising:

means for converting said video information into said video signals for transmittal to said monitor over said video line;

means for receiving said control data transmitted over said communication line and for forming said condition blocks and said sets of instruction blocks from the information in said control data;

means for storing said condition blocks and said corresponding sets of instructions blocks;

means for receiving user-generated event data;

means for setting the states of certain of said stored condition blocks in response to said user-generated event data; and     means for executing the instruction blocks in the sets of instruction blocks corresponding to the condition blocks which are in the active state, thereby causing the manipulation of said video signals and the setting of the states of certain of said stored condition blocks in accordance with the executed instruction blocks.

2. A video imaging device according to claim 1, further comprising:

means for converting said user-generated event data into at least one event data block;

and wherein said means for setting the states of certain of said condition blocks includes means for comparing said at least one event data block and said condition blocks to determine which of said condition blocks correspond to said at least one event data block, and means for setting into an active state any of said condition data blocks which correspond to said at least one event data block.

3. A video imaging device according to claim 1, wherein said means for receiving said control data comprises an asynchronous buffer.

4. A video imaging device according to claim 1, wherein said means for receiving said user-generated event data comprises an asynchronous buffer.

5. A method of controlling a display of an image on a monitor in a system including a video imaging device which is coupled to (i) a host computer by a communication line over which control data is transmitted, (ii) a source of video information and (iii) a monitor by a video line over which video signals based upon that video information and control data are transmitted, said control data including information for forming condition blocks, and corresponding sets of instruction blocks, each of said condition blocks being settable into an active or inactive state, and each of said instruction blocks containing at least one instruction to be executed by said video imaging device which either manipulates the video signals or sets the states of at least one of said condition blocks, the method comprising the steps of:

converting said video information into said video signals for transmittal to said monitor over said video line;

receiving said control data transmitted over said communication line;

forming said condition blocks and said instruction blocks form said control data;

storing said condition blocks and associated instruction blocks;

receiving user-generated event data for selection of said stored control data;

setting the states of certain of said stored condition blocks in response to said user-generated event data;

executing the instruction blocks in the sets of instruction blocks corresponding to the condition blocks in the active state; and altering said stored condition blocks by execution of at least some of said instruction blocks in the sets of instruction blocks corresponding to the condition blocks in the active state.

6. A method of claim 5 further including the steps of:

converting said user-generated event data into at least one event data block;

and wherein said step of setting the active states of certain condition blocks includes the substeps of comparing said at least one event data block to said condition data blocks to set into an activestate any of said condition data blocks to determine which of said condition blocks correspond to said at least one event data block, and setting into an active state any corresponding condition blocks.

* * * * *